(12) United States Patent
Okazawa

(10) Patent No.: US 11,164,320 B2
(45) Date of Patent: Nov. 2, 2021

(54) IMAGE PROCESSING APPARATUS AND METHOD FOR APPROPRIATELY SYNTHESIZING A PLURALITY OF IMAGES USING PROJECTION TRANSFORM MATRIX CALCULATION

(71) Applicant: OLYMPUS CORPORATION, Hachioji (JP)

(72) Inventor: Atsuro Okazawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/899,610

(22) Filed: Jun. 12, 2020

(65) Prior Publication Data
US 2020/0311949 A1    Oct. 1, 2020

Related U.S. Application Data

(63) Continuation of application No. PCT/JP2017/044964, filed on Dec. 14, 2017.

(51) Int. Cl.
*G06T 7/00* (2017.01)
*G06T 7/215* (2017.01)
(Continued)

(52) U.S. Cl.
CPC ............... *G06T 7/215* (2017.01); *G06T 3/20* (2013.01); *G06T 7/35* (2017.01); *G06T 7/38* (2017.01); *G06T 2207/10016* (2013.01)

(58) Field of Classification Search
CPC .. G06T 7/215; G06T 7/38; G06T 7/35; G06T 7/246; G06T 3/20; G06T 2207/10016; G06T 2207/20021; G06T 2207/20221
See application file for complete search history.

(56) References Cited

U.S. PATENT DOCUMENTS

| | | | |
|---|---|---|---|
| 10,491,815 B2 | 11/2019 | Kajimura et al. | |
| 2010/0067820 A1* | 3/2010 | Yano | H04N 5/232 382/260 |

(Continued)

FOREIGN PATENT DOCUMENTS

| | | |
|---|---|---|
| JP | H04148283 A | 5/1992 |
| JP | H10124684 A | 5/1998 |

(Continued)

OTHER PUBLICATIONS

International Preliminary Report on Patentability (IPRP) (and English language translation thereof) dated Jun. 16, 2020 issued in International Application No. PCT/JP2017/044964.

(Continued)

*Primary Examiner* — Chan S Park
*Assistant Examiner* — Claude Noel Y Zanetsie
(74) *Attorney, Agent, or Firm* — Holtz, Holtz & Volek PC

(57) ABSTRACT

A corresponding region movement amount calculation unit calculates the amount of movement of each of a plurality of corresponding characteristic regions between a reference image and a base image. A clustering processing unit groups one or more characteristic regions exhibiting a substantially identical tendency in the calculated amounts of movement as belonging to a plane group located on the same plane, and classifies the plurality of characteristic regions in one or more plane groups. A projection transform matrix calculation unit calculates one or more projection transform matrices, by using the amounts of movement of the characteristic regions and the result of the grouping performed by the clustering processing unit.

12 Claims, 9 Drawing Sheets

(51) Int. Cl.
  *G06T 7/38* (2017.01)
  *G06T 7/35* (2017.01)
  *G06T 3/20* (2006.01)

(56) References Cited

U.S. PATENT DOCUMENTS

2019/0208122 A1  7/2019  Okazawa
2020/0098119 A1  3/2020  Okazawa et al.

FOREIGN PATENT DOCUMENTS

JP    2011022805 A  *  2/2011
JP    2012003503 A  *  1/2012
JP      5499261 B2     3/2014

OTHER PUBLICATIONS

International Search Report (ISR) (and English translation thereof) dated Jan. 16, 2018 issued in International Application No. PCT/JP2017/044964.
Matsushita, et al., "Super-Resolution Processing of Camera Shake Videos for Scenes Containing 3D Shapes", PSJ Symposium on Image Recognition and Understanding (MIRU) 2011, in particular, "2 . Overview of Processing Method" "5. 2 Super-Resolution Processing Based on MAP Method" Jul. 20, 2011, pp. 951-958.
Uemura, et al., "Camera Motion Compensation Based on Multi Feature Points Tracking", IPSJ SIG Technical Report.

* cited by examiner

IMAGE PROCESSING APPARATUS AND METHOD FOR APPROPRIATELY SYNTHESIZING A PLURALITY OF IMAGES USING PROJECTION TRANSFORM MATRIX CALCULATION

CROSS-REFERENCE TO RELATED APPLICATIONS

This application is based upon and claims the benefit of priority from International Application No. PCT/JP2017/044964, filed on Dec. 14, 2017, the entire contents of which is incorporated herein by reference.

BACKGROUND OF THE INVENTION

1. Field of the Invention

The present invention relates to an image processing technology for synthesizing a plurality of images.

2. Description of the Related Art

Patent document 1 discloses an image processing apparatus that generates a high-resolution image by combining a plurality of low-resolution images by super-resolution processing. This image processing apparatus selects three or more feature points from among feature points on a base frame so as to generate an initial feature point set, and calculates a projection transform matrix from the initial feature point set based on the correspondence relationship for feature points between the base frame and each reference frame. Then, the image processing apparatus searches for feature points that match the projection transform matrix calculated for all the feature points of the base frame, adds matching feature points to the initial feature point set so as to update the initial feature point set, and generates a feature point set on the same plane. The image processing apparatus projects each pixel of each reference frame onto a base frame using each projection transform matrix obtained from each feature point set generated for each different plane of the image of the base frame, and, based on the projection result, selects the most matching feature point set from among feature point sets generated respectively for different planes. Then, for each pixel of each reference frame, the image processing apparatus calculates the amount of variation with respect to the corresponding pixel of the base frame using a projection transform matrix obtained from the selected feature point set, and calculates the amount of variation of the image of each reference frame with respect to the image of the base frame.

[Patent document 1] JP 5499261

In Patent document 1, first, three or more feature points are randomly selected so as to generate an initial feature point set, and a projection transform matrix is generated using feature points included in the initial feature point set. Then, feature points matching the transformation using the projection transform matrix are searched for, and matching feature points are added, thereby increasing a feature point set on the same plane. If no feature point is added to the initial feature point set, it is determined that the initial feature point set is an inappropriate set across a plurality of planes, and an initial feature point set is regenerated.

However, even when an initial feature point set is generated with feature points located across a plurality of planes, the position of feature points after the projection transform may match the position of feature points in the reference image due to a variability error of a feature point position caused by image noise or the like and to an error in a feature point position caused by an algorithm for corresponding point movement amount calculation. If such feature points are added to the initial feature point set located across a plurality of planes, an inappropriate projection transform matrix will be calculated as a result, and an error will occur in the alignment of the base image and the reference image. Therefore, there may be a problem that artifacts occur in a synthesized image.

SUMMARY OF THE INVENTION

In this background, a purpose of the present invention is to provide an image processing technique for appropriately synthesizing a plurality of images.

An image processing apparatus according to one embodiment of the present invention is an image processing apparatus adapted to synthesize one base image with one or more reference images acquired in a time series, including: a positional displacement amount calculation unit that calculates the amounts of positional displacement between a plurality of pixels in the base image and a plurality of corresponding pixels in the reference image, by using one or more projection transform matrices; and an image synthesis unit that transforms the reference image based on the amounts of positional displacement calculated by the positional displacement amount calculation unit and produces a synthesized image by synthesizing the transformed reference image with the base image. The positional displacement amount calculation unit has: a corresponding region movement amount calculation unit that calculates an amount of movement of each of a plurality of corresponding characteristic regions between a reference image and a base image; a clustering processing unit that groups one or more characteristic regions exhibiting a substantially identical tendency in the calculated amounts of movement as belonging to a plane group located on the same plane, and classifies the plurality of characteristic regions in one or more plane groups; and a projection transform matrix calculation unit that calculates one or more projection transform matrices, by using the amounts of movement of the characteristic regions and the result of the grouping performed by the clustering processing unit.

Another embodiment of the present invention relates to an image processing method adapted to synthesize one base image with one or more reference images acquired in a time series. This image processing method includes: calculating amounts of positional displacement between a plurality of pixels in the base image and a plurality of corresponding pixels in the reference image, by using one or more projection transform matrices; and transforming the reference image based on the calculated amounts of positional displacement and producing a synthesized image by synthesizing the transformed reference image with the base image. The calculating of the amounts of positional displacement has: calculating an amount of movement of each of a plurality of corresponding characteristic regions between a reference image and a base image; grouping one or more characteristic regions exhibiting a substantially identical tendency in the calculated amounts of movement as belonging to a plane group located on the same plane and classifying the plurality of characteristic regions in one or more plane groups; and calculating one or more projection transform matrices, by using the amounts of movement of the characteristic regions and a result of the grouping.

Optional combinations of the aforementioned constituting elements and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

Figure 1:
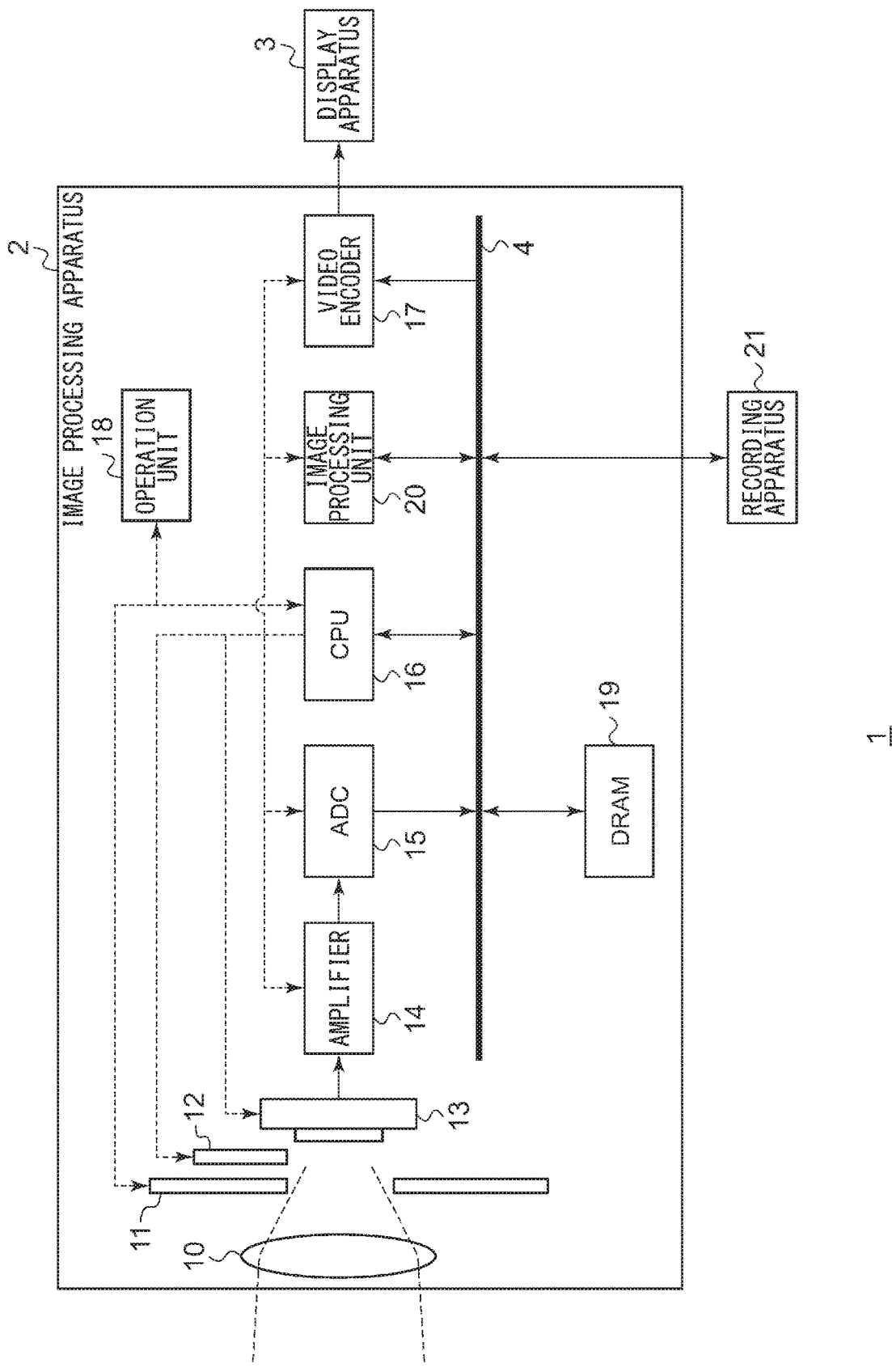
FIG. 1 is a diagram showing the configuration of an image capturing apparatus according to an embodiment.

FIG. 1 shows the configuration of an image capturing apparatus according to an embodiment. In the embodiment, the configuration of a digital camera 1 will be described as an example of an image capturing apparatus. However, another type of image capturing apparatus may be used. In FIG. 1, solid lines with an arrow indicate the flow of data, and broken lines with an arrow indicate the flow of a control signal.

The digital camera 1 according to the embodiment includes an image processing apparatus 2, a display apparatus 3, and a recording apparatus 21. The display apparatus 3 may be formed by a liquid crystal display, an organic EL display, or the like, and is provided on the back of the digital camera 1 or the like. The display apparatus 3 is used for live view display, display of recorded images, and the like. The recording apparatus 21 is built in or formed to be detachable from the digital camera 1 and records image data for recording in a predetermined format. The recording apparatus 21 may be a flash memory.

The image processing apparatus 2 according to the embodiment has a function of synthesizing one base image with one or more reference images acquired in a time series. For example, the image processing apparatus 2 sets the first image captured in a continuous image-capturing mode as a base image, sets the second and subsequent captured images as reference images, and synthesizes these images. Although the image processing apparatus 2 may have various functions, an image synthesizing function will be mainly described below.

The image processing apparatus 2 includes an imaging lens 10, a diaphragm 11, a mechanical shutter 12, an imaging device 13, an amplifier 14, an analog-to-digital converter (hereinafter, referred to as "ADC") 15, a CPU 16, a video encoder 17, an operation unit 18, a dynamic random access memory (hereinafter, referred to as "DRAM") 19, and an image processing unit 20. A bus 4 is connected to the ADC 15, the CPU 16, the image processing unit 20, the video encoder 17, the DRAM 19, and the recording apparatus 21, and various data generated by these components are transferred via the bus 4.

The operation unit 18 includes various operation buttons such as a power button, a release button, a play button, and a menu button, and various operation members such as a touch panel. The input to the operation unit 18 is processed by the CPU 16.

The imaging lens 10 forms an optical system, and has a single or a plurality of lenses for forming an image of a subject on the imaging device 13. The imaging lens 10 may be a single focus lens or a zoom lens. The diaphragm 11 is formed such that the aperture thereof can be changed, and is arranged on the optical axis of the imaging lens 10. The diaphragm 11 is provided in order to limit the amount of light flux passing through the imaging lens 10. The mechanical shutter 12 is formed so as to be openable and closable, and is arranged behind the diaphragm 11. By adjusting the opening time of the mechanical shutter 12, the incident time of an object light flux to the imaging device 13 is adjusted. That is, the mechanical shutter 12 is provided in order to adjust the exposure time of the imaging device 13. The mechanical shutter 12 may be a focal plane shutter, a lens shutter, or the like.

The imaging device 13 is arranged behind the mechanical shutter 12 on the optical axis of the imaging lens 10 and at a position where an image of the object light flux is formed by the imaging lens 10. The imaging device 13 has a structure in which photodiodes forming pixels are two-dimensionally arranged. On the front surface of the photodiodes, for example, a color filter having a Bayer array is arranged. The Bayer array has a line in which R pixels and G (Gr) pixels are alternately arranged in the horizontal direction, and a line in which G (Gb) pixels and B pixels are alternately arranged. Each photodiode generates a charge corresponding to the amount of received light and stores the charge in a capacitor connected to the photodiode. The charge stored in the capacitor is read out as an image signal in accordance with a control signal from the CPU 16.

The amplifier 14 performs analog gain adjustment of the image signal output from the imaging device 13. The ADC 15 converts the image signal on which analog gain adjustment has been performed by the amplifier 14 into a digital image signal (pixel data). In the embodiment, a value related to each pixel indicated by pixel data is referred to as a pixel value, and a group of a plurality of pieces of pixel data is referred to as imaging data. Imaging data that has been generated is written to the DRAM 19. In an image synthesizing process, the imaging data of the base image and the imaging data of the reference image are written to the DRAM 19.

The CPU 16 transmits a control signal so as to control, in an integrated manner, the operation of the digital camera 1 such as control of the aperture of the diaphragm 11, control of opening and closing of the mechanical shutter 12, control of the imaging device 13, and other control related to image processing.

The image processing unit 20 is formed by, for example, an application specific integrated circuit (ASIC). The image processing unit 20 reads the imaging data from the DRAM 19, performs an image process, and writes the imaging data back to the DRAM 19 as display image data and recording image data. For example, when recording a still image, the image processing unit 20 performs an image process for recording a still image so as to generate still image data. In the same manner, when recording a moving image, the image processing unit 20 performs an image process for recording a moving image so as to generate moving image data. Further, during live view display, the image processing unit 20 performs an image process for display so as to generate display image data.

Figure 2:
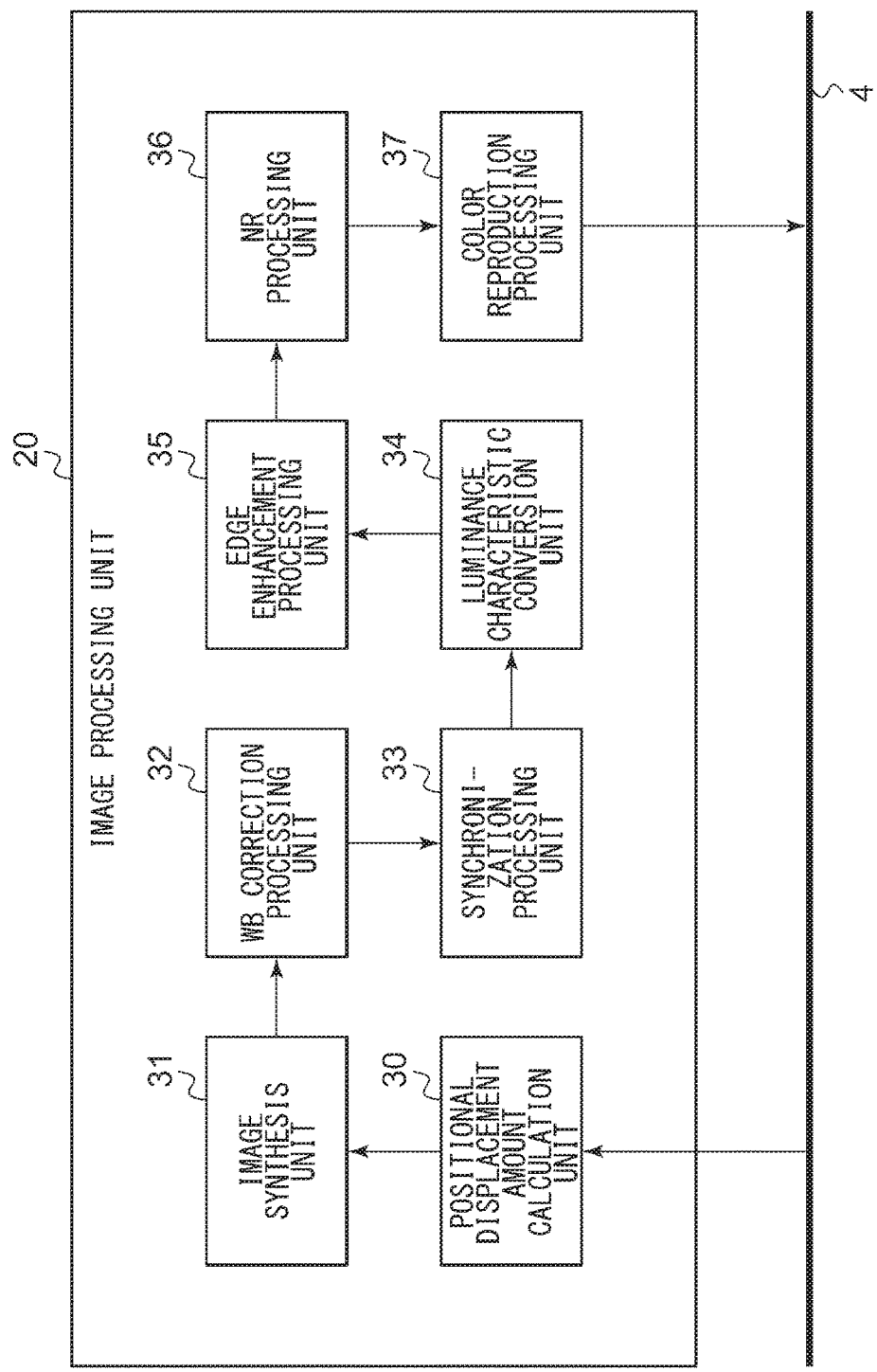
FIG. 2 is a diagram showing functional blocks of an image processing unit.

FIG. 2 shows functional blocks of the image processing unit 20. The image processing unit 20 includes a positional displacement amount calculation unit 30, an image synthesis unit 31, a white balance (WB) correction processing unit 32, a synchronization processing unit 33, a luminance characteristic conversion unit 34, an edge enhancement processing unit 35, a noise reduction (NR) processing unit 36, and a color reproduction processing unit 37. The image processing unit 20 may also have a structure such as a compression/expansion processing unit.

In FIG. 2, the elements shown in functional blocks that indicate a variety of processes are implemented in hardware by any circuit block, a main memory, other LSI's, or the like, and in software by a program loaded in main memory, etc. Therefore, a person skilled in the art should appreciate that there are many ways of accomplishing these functional blocks in various forms in accordance with the components of hardware only, software only, or the combination of both, and the way of accomplishing these functions is not limited to any particular one.

The positional displacement amount calculation unit 30 reads out the reference image to be aligned with the base image from the DRAM 19 and calculates the amounts of positional displacement between a plurality of pixels in the base image and a plurality of corresponding pixels in the reference image, by using one or more projection transform matrices. The image synthesis unit 31 performs a process of performing a geometrical conversion on the reference image based on the amounts of positional displacement calculated by the positional displacement amount calculation unit 30 and synthesizing the converted reference image with the base image as required so as to generate a synthesized image. The synthesizing process may be, for example, a technique of simply adding and averaging pixel values at the same coordinate position of the aligned image and the base image, and the technique is not limited. The purpose of the synthesizing process corresponds to various purposes such as noise reduction, high dynamic range (HDR), and super-resolution.

The WB correction processing unit 32 corrects the color balance of an image by amplifying each color component of the imaging data with a predetermined gain amount. The synchronization processing unit 33 converts, for example, imaging data output from the imaging device 13 in accordance with a Bayer array of color filters, where one pixel corresponds to one color component, into image data where one pixel corresponds to a plurality of color components. The luminance characteristic conversion unit 34 converts the luminance characteristic of the image data generated by the synchronization processing unit 33 in such a manner that the image data becomes suitable for display and recording. The edge enhancement processing unit 35 performs a process of enhancing an edge (contour) component in target image data by multiplying by an edge enhancement coefficient an edge signal extracted from the output data (image data) from the luminance characteristic conversion unit 34 using a band-pass filter or the like and adding the result to the original image data. The NR processing unit 36 removes a noise component in the output data (image data) from the edge enhancement processing unit 35 using a coring process or the like.

The color reproduction processing unit 37 performs various processes for making the color reproduction of an image appropriate. The processes performed include, for example, a color matrix arithmetic process. This color matrix arithmetic process is a process of multiplying image data by a color matrix coefficient according to, for example, a white balance mode. In addition to this, the color reproduction processing unit 37 performs, for example, a correction process of saturation and hue, and stores the image data in the DRAM 19.

The DRAM 19 is an electrically rewritable memory and temporarily stores various data such as the above-described imaging data (pixel data), recording image data, display image data, and processing data in the CPU 16. An SDRAM may be used as a temporary storage memory. The video encoder 17 reads out the display image data generated by the image processing unit 20 and temporarily stored in the DRAM 19, and outputs the read display image data to the display apparatus 3.

Figure 3:
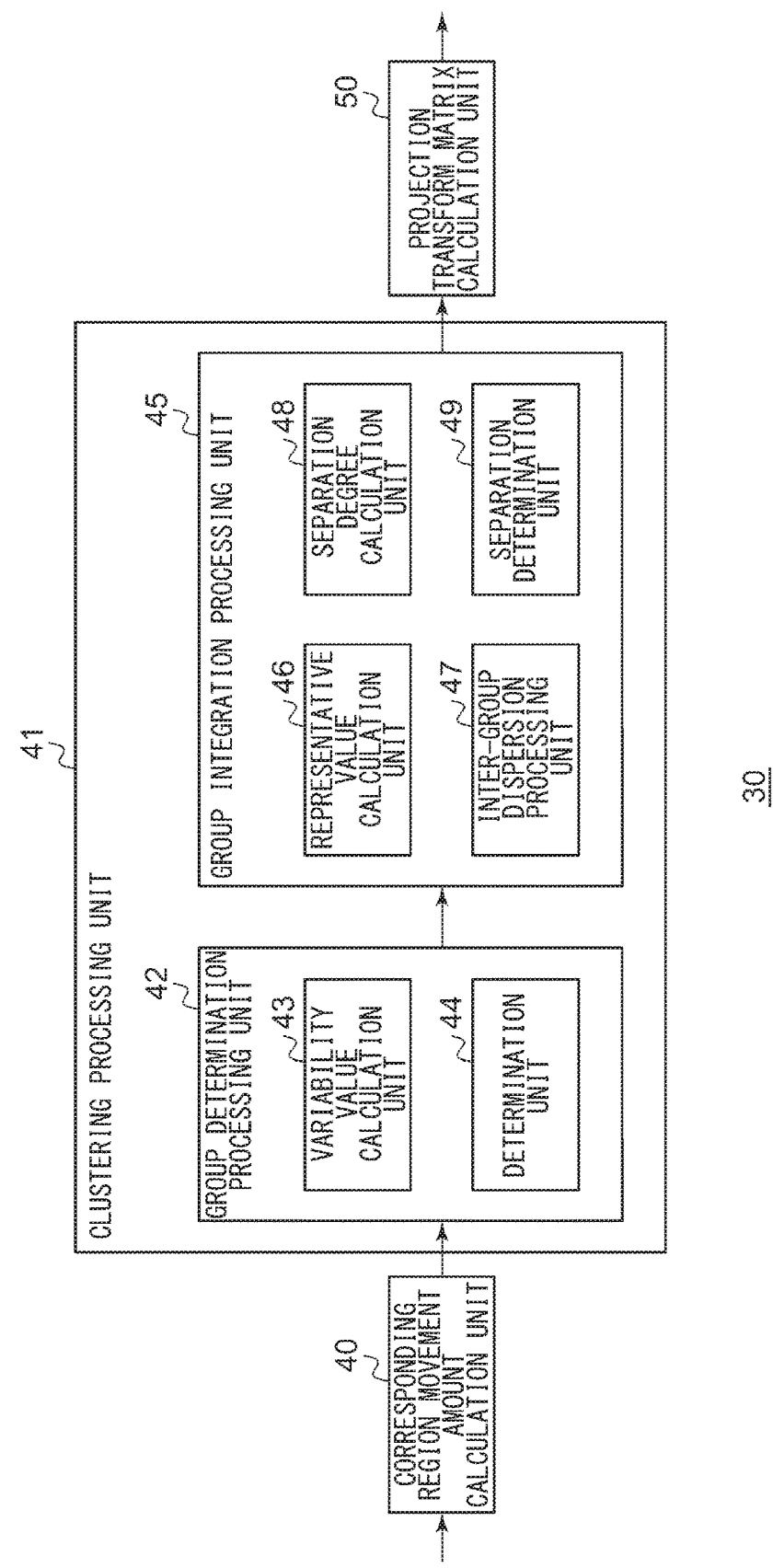
FIG. 3 is a diagram showing functional blocks of a positional displacement amount calculation unit.

FIG. 3 shows functional blocks of the positional displacement amount calculation unit 30. The positional displacement amount calculation unit 30 calculates the amounts of positional displacement between a plurality of pixels in the base image and a plurality of corresponding pixels in the reference image, by using one or more projection transform matrices. The positional displacement amount calculation unit 30 includes a corresponding region movement amount calculation unit 40, a clustering processing unit 41, and a projection transform matrix calculation unit 50.

By performing an optical flow, a feature point matching, or the like on a base image and a reference image arbitrarily set from among a plurality of captured images, the corresponding region movement amount calculation unit 40 obtains the amounts of positional displacement of characteristic regions of the images. Specifically, the corresponding region movement amount calculation unit 40 calculates the amount of movement of each of a plurality of corresponding characteristic regions between the reference image and the base image. The amount of movement of a characteristic region means the amount of displacement between the position of a characteristic region in the base image and the position of the corresponding characteristic region in the reference image.

The clustering processing unit 41 analyzes the tendencies of the amounts of movement of the characteristic regions output from the corresponding region movement amount calculation unit 40 and grouping the characteristic regions for each tendency. The clustering processing unit 41 performs a process of separating characteristic regions with different planes. Specifically, the clustering processing unit 41 performs a process of grouping one or more characteristic regions where the amounts of movement calculated by the corresponding region movement amount calculation unit 40 exhibit a substantially identical tendency as belonging to a plane group located on the same plane, and classifying the plurality of characteristic regions in one or more plane groups.

The projection transform matrix calculation unit 50 calculates one or more projection transform matrices, by using the amounts of movement of the characteristic regions and the result of the grouping performed by the clustering processing unit 41. If a plurality of plane groups are set according to the result of the grouping, the projection transform matrix calculation unit 50 calculates a projection transform matrix for each of the plurality of plane groups.

Figure 4A:
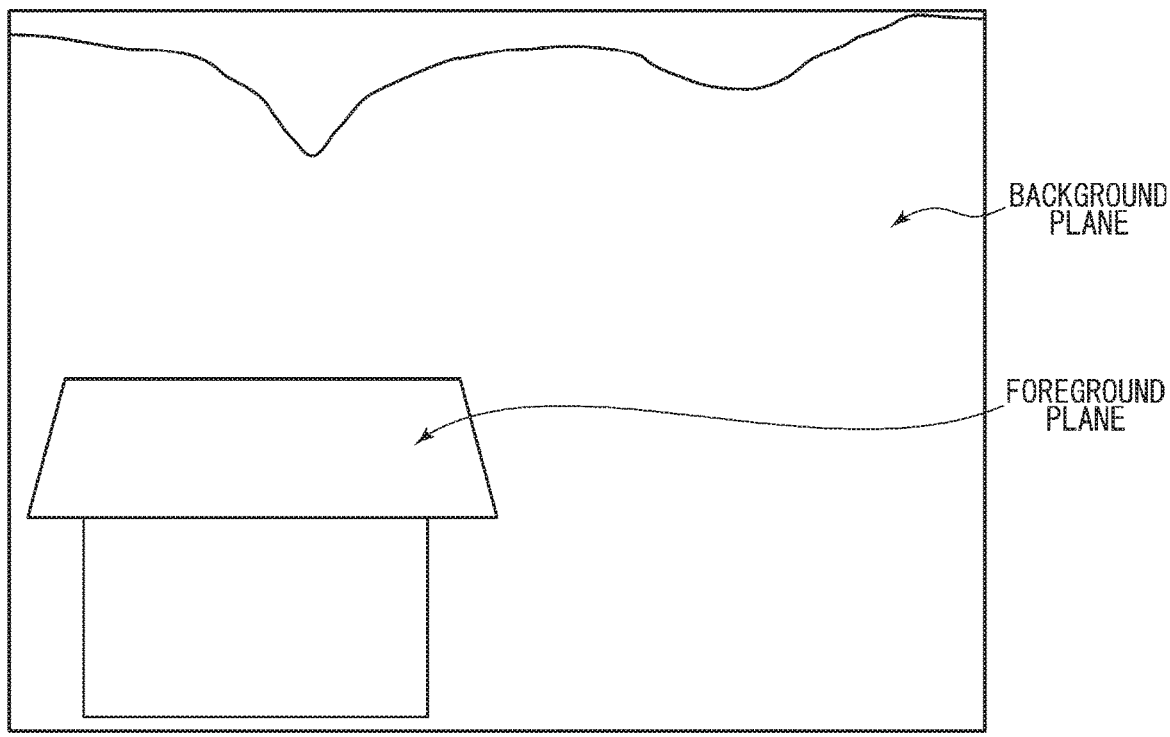
FIGS. 4A and 4B are diagrams showing an example of an image captured by a digital camera.

FIG. 4A is a diagram showing an example of an image captured by a digital camera. There are two different planes, i.e., a background plane and a foreground plane in this captured image. The foreground plane is a close object (house) whose distance from the digital camera 1 is relatively short as compared with the background plane.

Figure 4B:
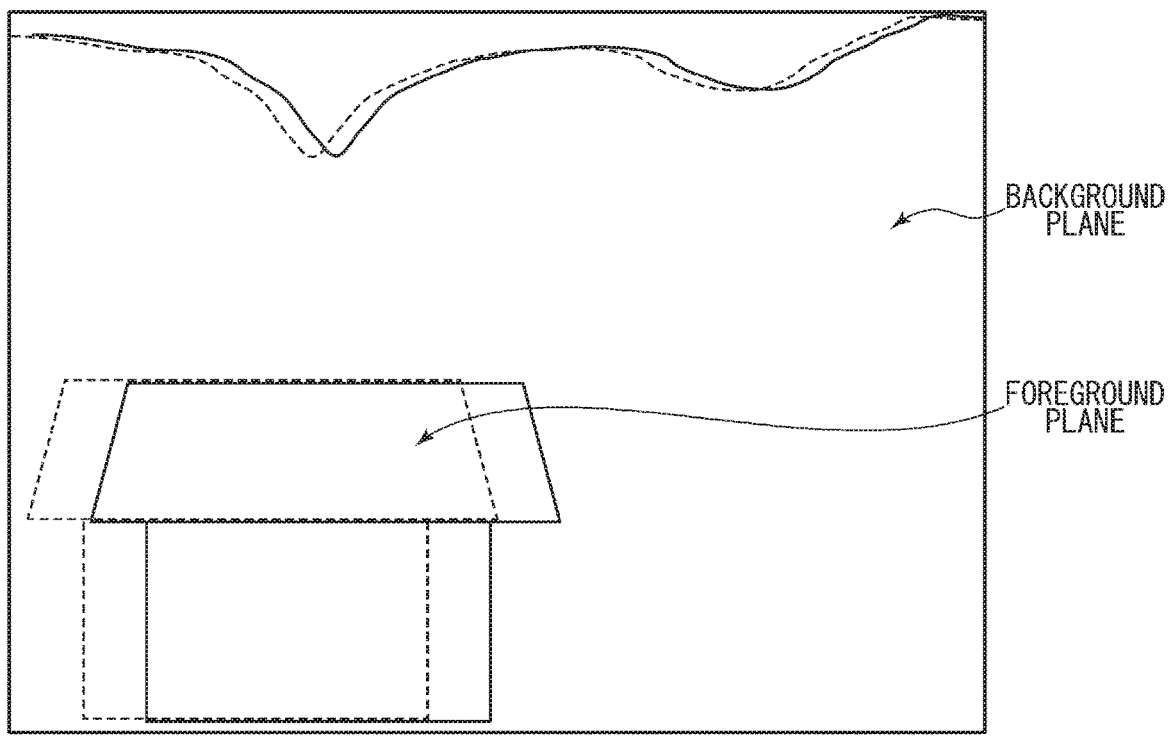

FIG. 4B shows an example of an image captured at a position where the digital camera 1 is translated rightward from the image capturing position of the image in FIG. 4A. In FIG. 4B, the image shown in FIG. 4A is indicated by a dotted line. There are two planes within the angle of view of the digital camera 1, and when the digital camera 1 is translated, the foreground plane existing at a short distance moves relatively more compared with the background plane existing at a long distance. This will be described using FIGS. 5A and 5B.

Figure 5A:
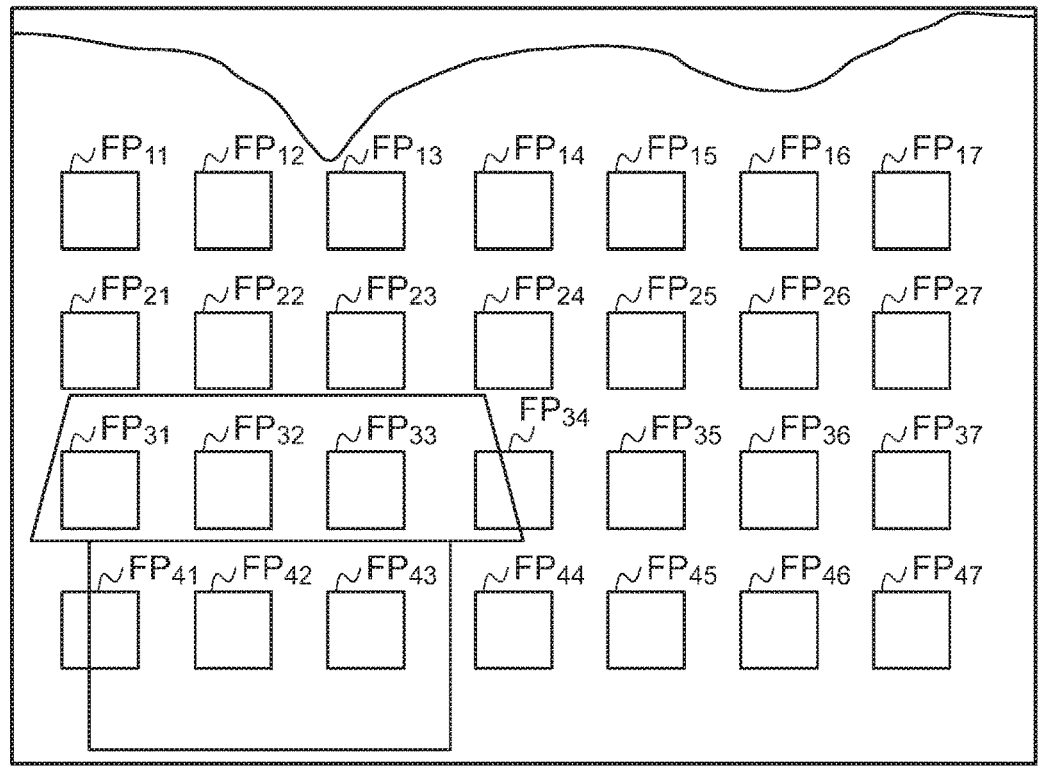
FIGS. 5A and 5B are diagrams showing an example of characteristic regions in a captured image.

FIG. 5A shows an example of characteristic regions in the captured image shown in FIG. 4A. The figure shows a state in which 28 characteristic regions FP are extracted. Various methods for extracting characteristic regions (feature points) have been conventionally proposed, and a corner detection method is a representative method. However, characteristic regions may be extracted by other methods.

Figure 5B:
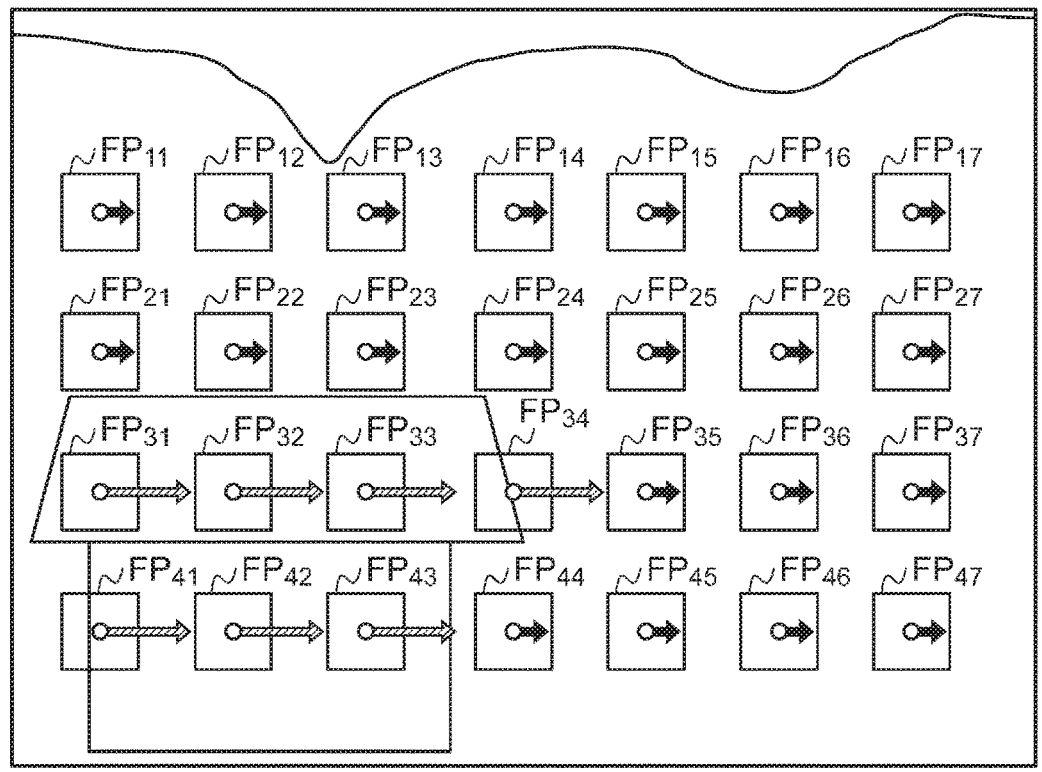

FIG. 5B represents, by arrow lengths, the amounts of movement of the characteristic regions when the digital camera 1 has translational motion. As shown in FIG. 4B, the foreground plane moves more than the background plane, which exists at a long distance. In other words, the tendency of the movement of a characteristic region in the background plane differs from that in the foreground plane. If characteristic regions existing on a plurality of planes are grouped as belonging to one plane group, an appropriate projection transform matrix cannot be calculated. Therefore, it is necessary to appropriately group characteristic regions existing on different planes.

The clustering processing unit 41 according to the embodiment performs a clustering process of grouping one or more characteristic regions where the amounts of movement calculated by the corresponding region movement amount calculation unit 40 exhibit a substantially identical tendency as belonging to a plane group located on the same plane, and classifying the plurality of characteristic regions in one or more plane groups.

The clustering processing unit 41 has a group determination processing unit 42 and a group integration processing unit 45. The group determination processing unit 42 has a variability value calculation unit 43 and a determination unit 44 and determines a plurality of plane groups by allocating each of the plurality of characteristic regions to one of the plurality of plane groups.

The group determination processing unit 42 allocates each of the plurality of characteristic regions to one of the plurality of plane groups so as to temporarily determine a set of a plurality of plane groups. The group determination processing unit 42 then derives a statistical variability value of the amounts of movement of one or more characteristic regions in the temporarily determined set of a plurality of plane groups. When the temporarily determined set of a plurality of plane groups is referred to as a temporarily determined combination of plane groups, the group determination processing unit 42 repeats this process of temporarily determining a combination, obtains a variability value for each combination, and identifies the optimum combination of plane groups based on the variability value of each combination so as to determine a final combination of plane groups.

In order to perform such a group determination process, first, the variability value calculation unit 43 calculates a statistical variability value of the temporarily determined set of a plurality of plane groups. More specifically, the variability value calculation unit 43 calculates, as the statistical variability value of the temporarily determined set of a plurality of plane groups, one of a dispersion, standard deviation, and mean error of the one or more characteristic regions in each plane group. When the variability value (variance, standard deviation, mean error, and the like) in each plane group is small, the plane group can be considered to have been grouped by a group of characteristic regions exhibiting a substantially identical tendency in the amount of movement.

In the embodiment, the group determination processing unit 42 allocates the plurality of characteristic regions to either one of two plane groups, a group A and a group B, so as to temporarily determine each plane group. The variability value calculation unit 43 calculates the standard deviation (Aσ) of the group A and the standard deviation (Bσ) of the group B as the variability value of the group A and the variability value of the group B that are temporarily determined, using the following Equations (1) and (2):

[Expression 1]
$$A\sigma = \sqrt{\frac{1}{n1}\sum_{i=1}^{n1}(A_i - A\_avg)^2} \quad (1)$$

[Expression 2]
$$B\sigma = \sqrt{\frac{1}{n2}\sum_{i=1}^{n2}-(Bi - B\_avg)^2} \quad (2)$$

wherein,

A_avg: average amount of movement of a characteristic region belonging to group A B_avg: average amount of movement of a characteristic region belonging to group B n1: the number of characteristic regions belonging to group A n2: the number of characteristic regions belonging to group B Ai: the amount of movement of each characteristic region belonging to group A Bi: the amount of movement of each characteristic region belonging to group B In the embodiment, the variability value calculation unit 43 calculates the standard deviation as the variability value in a group. However, in consideration of the constraints such as the processing time and the circuit scale, the variability value calculation unit 43 may calculate a statistical value that represents the variability value such as the mean error and the dispersion. Further, in the embodiment, although the clustering processing unit 41 divides a plurality of characteristic regions into two plane groups, the clustering processing unit 41 may divide the plurality of characteristic regions into three or more plane groups. A grouping count (the number of groups to be allocated) may be set as an initial value or may be freely set by the user. The optimal grouping count may be derived using an existing program module that searches for the optimal grouping count.

The group determination processing unit 42 temporarily determines the group A and the group B in various combinations. In the embodiment, the variability value calculation unit 43 is in charge of the temporary determination process, and the variability value calculation unit 43 temporarily determines the group A and the group B of various combinations and calculates the variability value in each group.

The determination unit 44 calculates, for each temporarily determined set of a plurality of plane groups, the sum of the statistical variability values of the respective plane groups and determines the final set of the plane groups that results in a minimum sum of statistical variability values. In other words, for each temporarily determined combination of the group A and the group B, the determination unit 44 derives an addition value obtained by adding up the respective variability values of the groups, identifies the combination having the smallest addition value, and determines the combination as the final set of the group A and the group B. When the determination unit 44 determines the final set of a plurality of plane groups, the group determination process in the group determination processing unit 42 is completed.

An addition value (E) of the respective variability values of the groups is calculated by Equation (3) as follows:

$$E = A\sigma + B\sigma \quad (3)$$

The determination unit 44 identifies the groups A and B that result in the minimum E and confirms the grouping result.

Figure 6A:
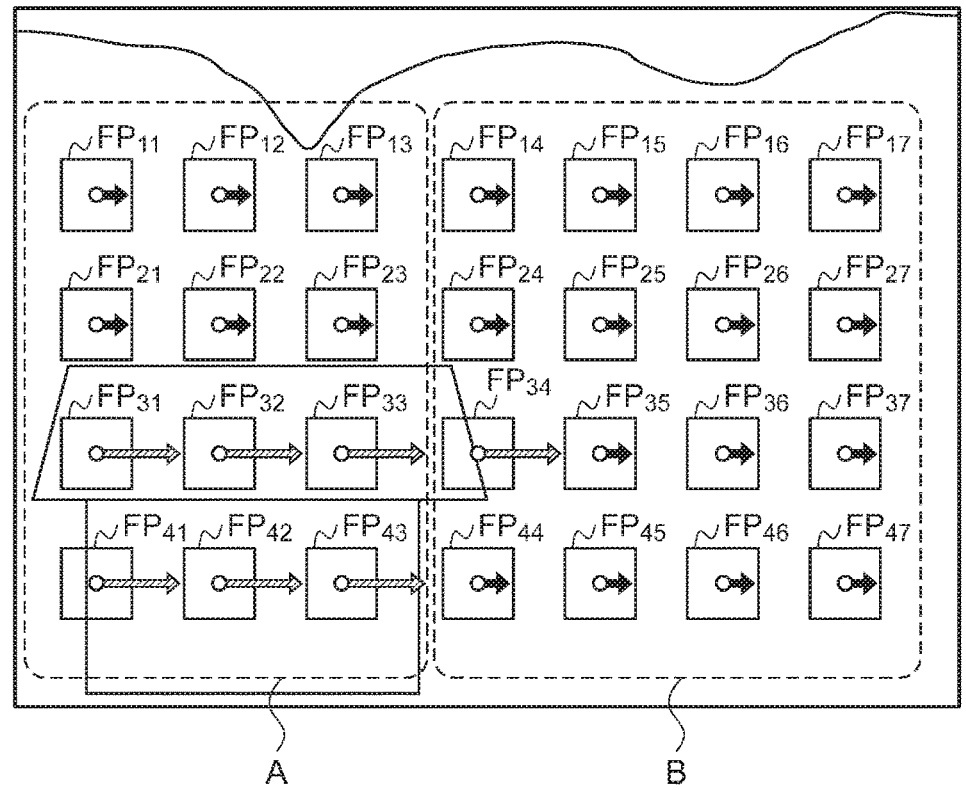
FIGS. 6A and 6B are diagrams showing an example of a condition where a plurality of characteristic regions are arbitrarily divided into two groups.

FIG. 6A shows an example of a condition where a plurality of characteristic regions shown in FIG. 5B are arbitrarily divided into two groups. In FIG. 5B, it is assumed that a short arrow represents the amount of movement of 10 pixels, and a long arrow represents the amount of movement of 30 pixels. In this example, the variability value calculation unit 43 divides a plurality of characteristic regions FP into a group A and a group B as described below.

(Group A)
$FP_{11}$, $FP_{12}$, $FP_{13}$, $FP_{21}$, $FP_{22}$, $FP_{23}$, $FP_{31}$, $FP_{32}$, $FP_{33}$, $FP_{41}$, $FP_{42}$, $FP_{43}$ (Group B)
$FP_{14}$, $FP_{15}$, $FP_{16}$, $FP_{17}$, $FP_{24}$, $FP_{25}$, $FP_{26}$, $FP_{27}$, $FP_{34}$, $FP_{35}$, $FP_{36}$, $FP_{37}$, $FP_{44}$, $FP_{45}$, $FP_{46}$, $FP_{47}$ At this time the following equations are derived for the group A.
A_avg=20 pixels
n1=12
The following equations are derived for the group B.
B_avg=11.3 pixels
n2=16

Figure 6B:
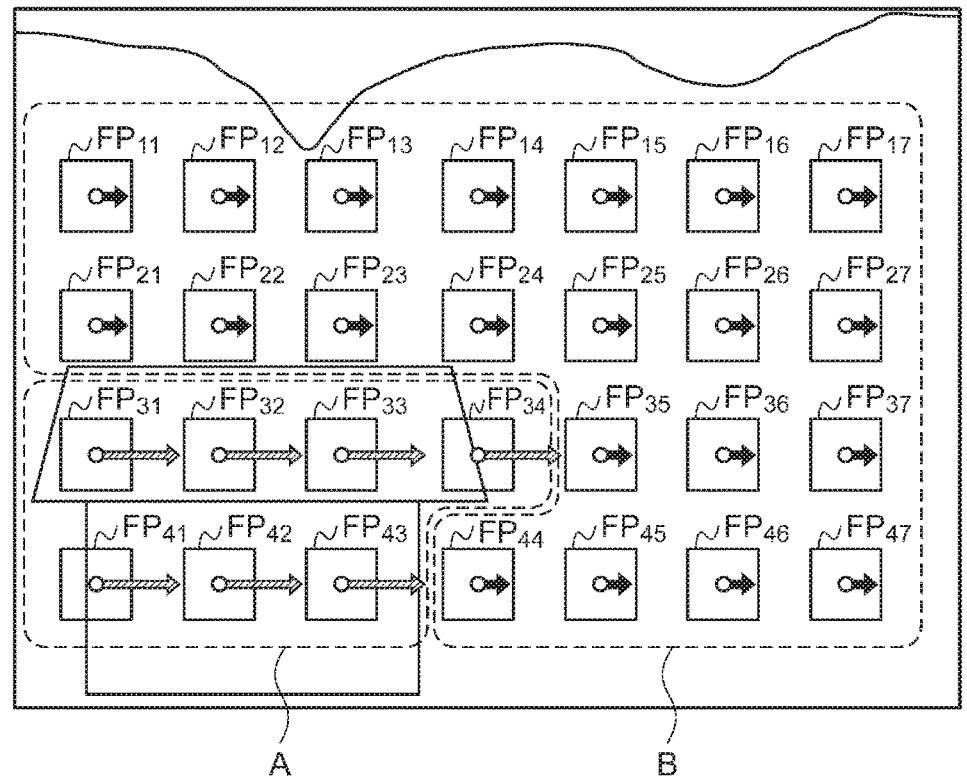

The variability value calculation unit 43 calculates the standard deviation (A$\sigma$) of the group A and the standard deviation (B$\sigma$) of the group B using Equations (1) and (2) as follows.
A$\sigma$=10 pixels
B$\sigma$=4.84 pixels The determination unit 44 calculates the addition value (E) of the respective variability values of the groups as follows using Equation (3).
E=14.84 pixels FIG. 6B shows another example of a condition where a plurality of characteristic regions shown in FIG. 5B are arbitrarily divided into two groups. In this example, the variability value calculation unit 43 divides a plurality of characteristic regions FP into a group A and a group B as described below.

(Group A)
$FP_{31}$, $FP_{32}$, $FP_{33}$, $FP_{34}$, $FP_{41}$, $FP_{42}$, $FP_{43}$ (Group B)
$FP_{11}$, $FP_{12}$, $FP_{13}$, $FP_{14}$, $FP_{15}$, $FP_{16}$, $FP_{17}$, $FP_{21}$, $FP_{22}$, $FP_{23}$, $FP_{24}$, $FP_{25}$, $FP_{26}$, $FP_{27}$, $FP_{35}$, $FP_{36}$, $FP_{37}$, $FP_{44}$, $FP_{45}$, $FP_{46}$, $FP_{47}$ At this time the following equations are derived for the group A.
A_avg=30 pixels
n1=7
The following equations are derived for the group B.
B_avg=10 pixels
n2=21

The variability value calculation unit 43 calculates the standard deviation (A$\sigma$) of the group A and the standard deviation (B$\sigma$) of the group B using Equations (1) and (2) as follows.
A$\sigma$=0 pixel
B$\sigma$=0 pixel The determination unit 44 calculates the sum (E) of the respective variability values of the groups as follows using Equation (3).
E=0 pixel As described above, the determination unit 44 calculates, for each temporarily determined set of a plurality of plane groups, the sum of the statistical variability values of the respective plane groups. The determination unit 44 compares the sum (E) of variability values calculated for each set and determines the final set of a plurality of plane groups that results in a minimum sum of variability values. In this example, E takes the smallest value when grouping is performed as shown in FIG. 6B. Therefore, the grouping at this time is determined to be final, and the characteristic regions belonging to each group are determined.

In the embodiment, since the grouping where E=0 is realized, the determination unit 44 may end the group determination process at this point. On the other hand, when E does not become 0, the grouping when E becomes the smallest is determined to be final among various groupings that are performed, and characteristic regions belonging to each group are determined. As a method of obtaining the minimum E, the search may be performed while switching feature points belonging to a group using all combinations, or a known method such as the Newton method may be used.

When the group determination processing unit 42 determines a plurality of groups that realize the minimum E, in this example, the group A and the group B, the group determination processing unit 42 provides the determination detail to the group integration processing unit 45. The group integration processing unit 45 has a representative value calculation unit 46, an inter-group dispersion processing unit 47, a separation degree calculation unit 48, and a separation determination unit 49, and performs a process of calculating the separation degree between different plane groups and integrating different plane groups in accordance with the value of the separation degree. That is, the group integration processing unit 45 determines whether or not the plurality of groups determined by the group determination processing unit 42 are appropriate.

For example, when characteristic regions are separated into a plurality of groups in a captured image in which only one plane exists, the group integration processing unit 45 suppresses the separation. If a plurality of characteristic regions located on the same plane are treated as being located on a plurality of planes, the number of characteristic regions (the number of samples) for each plane group is smaller than that of a case where the plurality of characteristic regions belong to one plane group. It is known that the larger the number of samples, the more appropriately the projection transform matrix of the same plane group can be obtained. Therefore, it is not preferable that the characteristic regions located on the same plane are dispersed over a plurality of plane groups. The group integration processing unit 45 calculates the separation degree between different plane groups. When the separation degree is small such that the plane groups can be considered as the same plane group, the group integration processing unit 45 performs a process of integrating the different plane groups into one plane group.

First Exemplary Embodiment

The representative value calculation unit 46 derives a representative value of each plane group by calculating at least one of an average value, median value, mode value, dispersion, standard deviation, and mean error of the amounts of movement of one or more characteristic regions in each plane group.

In the first exemplary embodiment, for the groups A and B obtained by the group determination processing unit 42, the representative value calculation unit 46 calculates the dispersion value of characteristic regions for each group as a representative value. The representative value calculation unit 46 calculates a representative value (A_re) of the group A and a representative value (B_re) of the group B by the following Equations (4) and (5).

[Expression 3]

$$A\_re = \frac{1}{n1}\sum_{i=1}^{n1} (Ai - A\_avg)^2 \quad (4)$$

[Expression 4]

$$B\_re = \frac{1}{n2}\sum_{i=1}^{n2} (Bi - B\_avg)^2 \quad (5)$$

wherein,

A_avg: average amount of movement of a characteristic region belonging to group A B_avg: average amount of movement of a characteristic region belonging to group B n1: the number of characteristic regions belonging to group A n2: the number of characteristic regions belonging to group B Ai: the amount of movement of each characteristic region belonging to group A Bi: the amount of movement of each characteristic region belonging to group B In the exemplary embodiment, the representative value calculation unit 46 calculates the dispersion value as the representative value of each group. Alternatively, the representative value calculation unit 46 may calculate the average value, median value, mode value, standard deviation, mean error, or the like of the amounts of movement of the characteristic regions as the representative value.

The inter-group dispersion processing unit 47 calculates the dispersion between different plane groups. More specifically, the inter-group dispersion processing unit 47 derives the inter-group dispersion and the intra-group dispersion of the groups A and B. When the intra-group dispersion is small and the inter-group dispersion is large, it is determined that the group A and the group B appropriately include characteristic regions exhibiting a different tendency in the amount of movement.

The inter-group dispersion processing unit 47 calculates the intra-group dispersion (V) and the inter-group dispersion (B) using the following Equations (6) and (7).

[Expression 5]

$$V = \frac{n1 \times A\_re + n2 \times B\_re}{n1 + n2} \quad (6)$$

[Expression 6]

$$B = \frac{n1 \times (A_{avg} - all_{avg})^2 + n2 \times (B\_avg - all\_avg)^2}{n1 + n2} \quad (7)$$

wherein, all_avg: average amount of movement of all characteristic regions

The separation degree calculation unit 48 derives the degree of separation between different plane groups by using the calculated dispersion between the groups. In the first exemplary embodiment, the separation degree calculation unit 48 calculates the degree of separation (D1) between different plane groups by using the intra-group dispersion (V) calculated using the representative value and the inter-group dispersion (B). The degree of separation (D1) is an index for determining whether or not the group A and the group B are groups that exhibit different tendencies. The separation degree calculation unit 48 calculates the degree of separation (D1) as follows using Equation (8).

$$D1 = B/V \quad (8)$$

The separation determination unit 49 determines whether or not the value of the degree of separation (D1) derived by the separation degree calculation unit 48 is lower than a predetermined value. When the value of the degree of separation is lower than the predetermined value, the separation determination unit 49 performs a process of integrating the different plane groups as a single group, and when the value of the degree of separation is equal to or more than the predetermined value, the separation determination unit 49 determines that the grouping of the different plane groups has been properly performed and confirms the grouping.

Second Exemplary Embodiment

In the second exemplary embodiment, a description will be given of a group integration process that can be realized when there is a restriction on the processing time and the circuit size as compared with the first exemplary embodiment. In the second exemplary embodiment, the inter-group dispersion processing unit 47 does not operate. In the second exemplary embodiment, for the groups A and B obtained by the group determination processing unit 42, the representative value calculation unit 46 calculates an average value (may be a median value or a mode value) and a standard deviation of the characteristic regions of each group as a representative value. The formula for calculating the standard deviation is as shown in Equations (1) and (2).

The separation degree calculation unit 48 calculates the degree of separation (D2) between different plane groups by using the obtained representative value. The degree of separation (D2) is an index for determining whether or not the group A and the group B are groups that exhibit different tendencies. The separation degree calculation unit 48 calculates the degree of separation (D2) as follows using Equation (9).

$$D2 = |A\_avg - B\_avg| - A\sigma - B\sigma$$

The separation determination unit 49 determines whether or not the value of the degree of separation (D2) derived by the separation degree calculation unit 48 is lower than a predetermined value. When the value of the degree of separation is lower than the predetermined value, the separation determination unit 49 performs a process of integrating the different plane groups as a single group, and when the value of the degree of separation is equal to or more than the predetermined value, the separation determination unit 49 determines that the grouping of the different plane groups has been properly performed and confirms the grouping.

As described, when the degree of separation between different plane groups is low, the group integration processing unit 45 integrates the different plane groups as a single group. As a result, the number of characteristic regions in a group can be increased, and the accuracy of the projection transform matrix can thus be increased. When performing the integration process, the group integration processing unit 45 may notify the group determination processing unit 42 of the result so as to cause the group determination processing unit 42 to perform grouping again. When the group integration processing unit 45 determines grouping, the projection transform matrix calculation unit 50 performs a projection transform matrix calculation process using the amounts of movement of the characteristic regions and the grouping result.

Figure 7A:
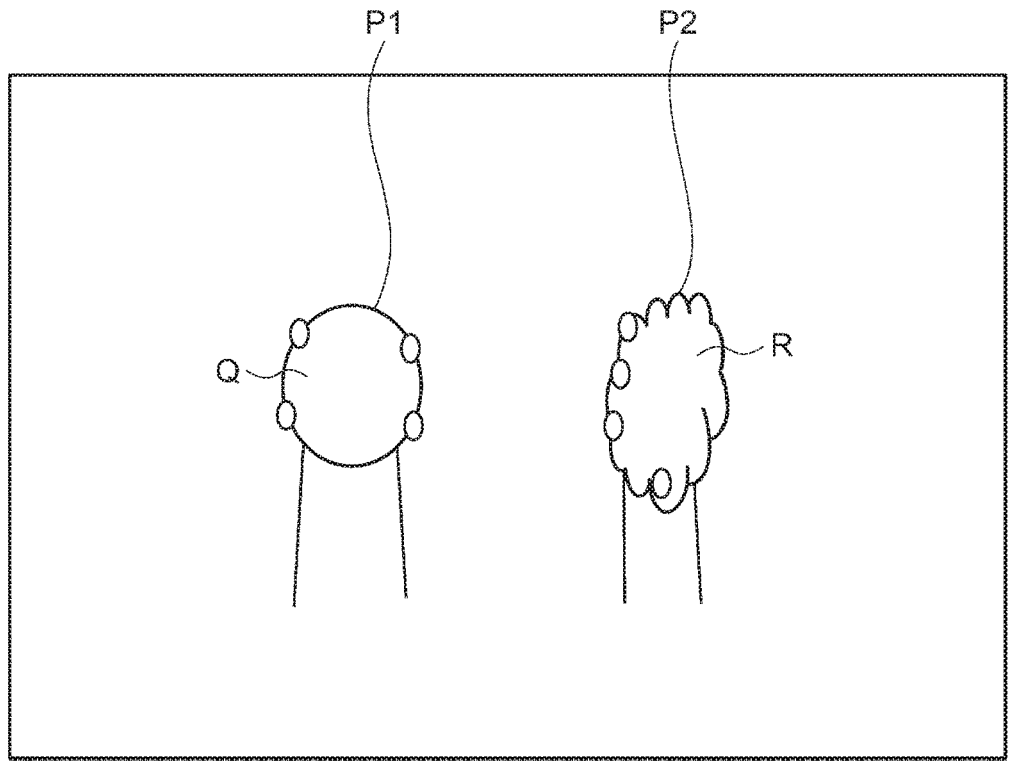
FIG. 7A is a diagram showing an example of a base image.
Figure 7B:
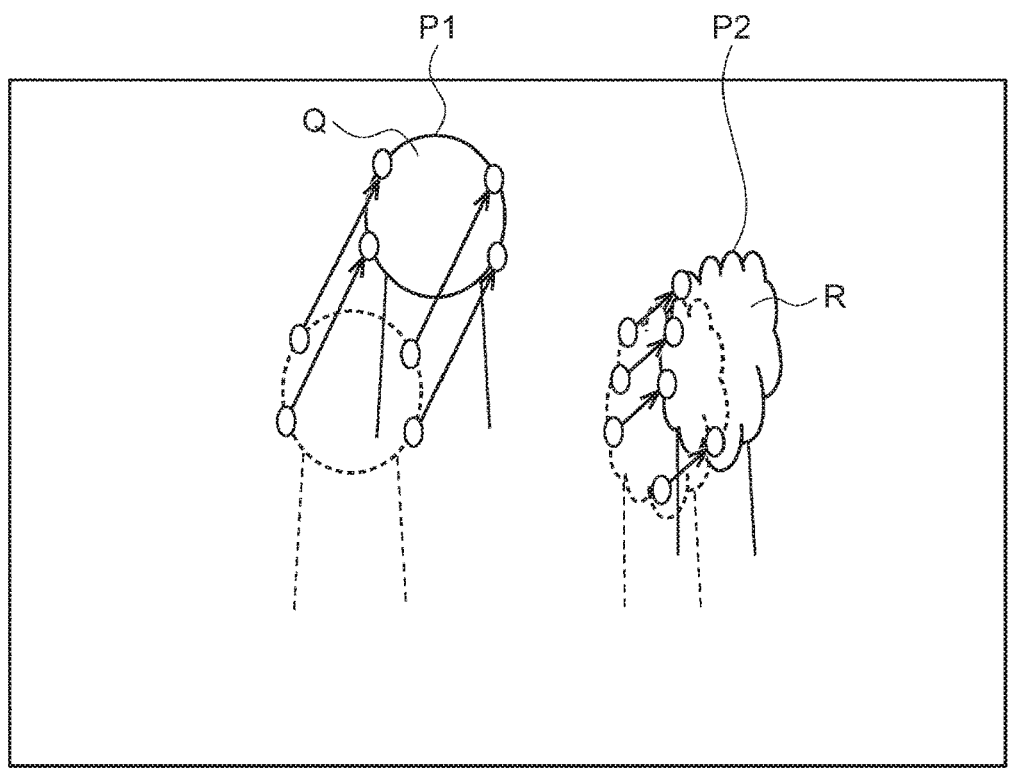
FIG. 7B is a diagram showing an example of a reference image.

FIG. 7A shows an example of a base image. In the figure, two objects Q and R having different depths are imaged. In a plane P1 of the object Q and a plane P2 of the object R, characteristic regions (feature points) are set for each one. FIG. 7B shows an example of a reference image. In the digital camera 1 according to the embodiment, the image processing unit 20 performs a process of synthesizing one base image with one or more reference images acquired in a time series. For example, in a continuous image-capturing mode, the base image is an image captured first, and a reference image is one of images continuously captured after the base image.

The projection transform matrix calculation unit 50 derives a projection transform matrix for each plane group using the information of characteristic regions that belong to the same plane. Therefore, the projection transform matrix calculation unit 50 calculates projection transform matrices for the number of the groups.

The purpose of calculating a projection transform matrix for each plane group will now be described. It is assumed that the object Q imaged on the plane P1 is located on the front side of the object R imaged on the plane P2. In FIG. 7A, although the object R located in the back is larger in the real world than the object Q located in the front, the object R is imaged in a smaller size in the captured projection image because the distance from the digital camera 1 is farther than that of the object Q located in the front, and as a result, the objects look equal in size.

In this situation, as shown in FIG. 7B, when the digital camera 1 is translated, although the object Q located in the front with a short object distance largely moves on the projection image, the amount of movement of the object R located in the far back with a long object distance is small. As described, image regions having different object distances are different in the amount of movement, and the difference appears as a difference in the amount of positional displacement between the base image and the reference image. In the images, the amounts of positional displacement that exhibit a plurality of tendencies of the amounts of movement are caused due to the difference in an object distance, and in order to correctly align the positional displacement, a plurality of projection transform matrices according to the tendencies of the amounts of movement are required.

Therefore, the projection transform matrix calculation unit 50 calculates a plurality of projection transform matrices for which the amounts of positional displacement are modeled, based on the result of grouping performed by the clustering processing unit 41. After deriving the plurality of projection transform matrices each for a flat plane group, the projection transform matrix calculation unit 50 derives the amount of movement for each pixel position. For example, the projection transform matrix calculation unit 50 derives the coordinate position on the base image that corresponds to a coordinate position on a reference image.

x, y: coordinate position on reference image x', y': coordinate position to be derived on base image plane selection result for x, y pixel position: p(x,y) projection transform matrix for plane P1:

$$\begin{pmatrix} H1 & H2 & H3 \\ H4 & H5 & H6 \\ H7 & H8 & 1 \end{pmatrix} \quad \text{[Expression 7]}$$

projection transform matrix for plane P2:

$$\begin{pmatrix} G1 & G2 & G3 \\ G4 & G5 & G6 \\ G7 & G8 & 1 \end{pmatrix} \quad \text{[Expression 8]}$$

If p(x,y) is on plane P1, the coordinate position is obtained as follows:

$$\begin{pmatrix} x' \\ y' \\ 1 \end{pmatrix} = \begin{pmatrix} H1 & H2 & H3 \\ H4 & H5 & H6 \\ H7 & H8 & 1 \end{pmatrix} \begin{pmatrix} x \\ y \\ 1 \end{pmatrix} \quad \text{[Expression 9]}$$

If p(x,y) is on plane P2, the coordinate position is obtained as follows:

$$\begin{pmatrix} x' \\ y' \\ 1 \end{pmatrix} = \begin{pmatrix} G1 & G2 & G3 \\ G4 & G5 & G6 \\ G7 & G8 & 1 \end{pmatrix} \begin{pmatrix} x \\ y \\ 1 \end{pmatrix} \quad \text{[Expression 10]}$$

Conversion to the amounts of positional displacement is as follows:

$$\text{dif}\_x = x - x'$$

$$\text{dif}\_y = y - y'$$

wherein dif_x is the amount of positional displacement when the x coordinate position in the reference image is aligned with the x coordinate position in the base image, and dif_y is the amount of positional displacement when the y coordinate position in the reference image is aligned with the y coordinate position in the base image. The projection transform matrix calculation unit 50 calculates the amount of positional displacement of each pixel position in the reference image and provides the amount of positional displacement to the image synthesis unit 31.

Regarding a projection transform matrix of which plane is to be applied to the pixel, a method is used where a plurality of images that are geometrically transformed respectively according to the projection transform matrices of the respective planes are generated, the value of difference between the base image and each generated image is derived for each pixel and where a projection transform matrix used at the time of generating an image with the smallest difference is then applied. However, this is merely an example, and the present invention is not limited to this.

Figure 8:
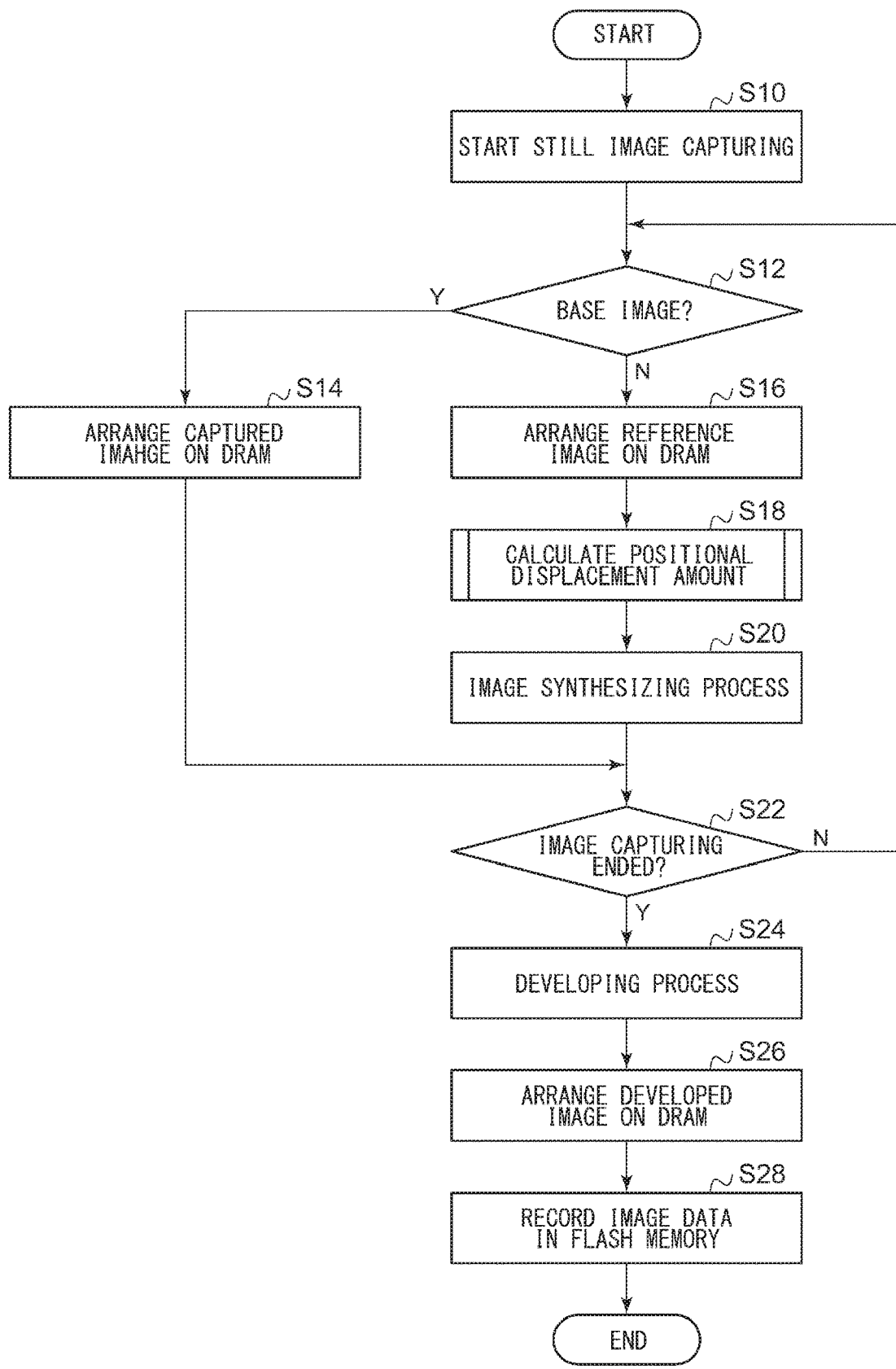
FIG. 8 is a diagram showing a flowchart of a still image recording process by a digital camera.

The operation of the digital camera 1 according to the embodiment will be described. FIG. 8 shows a flowchart of a still image recording process by a digital camera. This still image recording is started, for example, when the release button is pressed in the continuous image-capturing mode during live view display. Processes on still image recording will be described here. However, the same processes may be performed in the operation of moving image recording. In each process shown in the flowchart shown in FIG. 8, the CPU 16 controls the process, and the ASIC executes the process. Programs related to these processes may be recorded on various recording media such as an optical disk, a magnetic disk, and a semiconductor memory.

The CPU 16 starts image capturing for still image recording (S10). The CPU 16 determines whether the image captured this time serves as the base image (S12). At the start of the continuous image capturing, the CPU 16 determines that the image is the base image if the image is the first still image (Y in S12). When the image is the base image, the captured image is written to the DRAM 19 via the bus 4 as the base image (S14), and the next image capturing is performed (N in S22). The base image written to the DRAM 19 is stored in the DRAM 19 until the image synthesizing process ends.

The CPU 16 determines whether the image captured this time serves as the base image (S12) Upon determining that the image does not serve as the base image (N in S12), the CPU 16 writes the image to the DRAM 19 as a reference image (S16). The image processing unit 20 reads the base image arranged in the DRAM 19 and the reference image written this time, and performs a positional displacement amount calculation process (S18). The details of the positional displacement amount calculation process will be described later with reference to FIG. 9. The image processing unit 20 synthesizes the reference image for which the amount of positional displacement has been calculated with the base image (S20). In the image processing unit 20, the image synthesis unit 31 may determine a pixel value at each pixel position by extending the image accuracy to high resolution image accuracy by using the calculated amount of positional displacement.

The steps S12 to S20 are repeatedly performed until the continuous image capturing ends (N in S22). The CPU 16 determines whether or not an instruction to stop continuous image capturing has been entered. An instruction to stop continuous image capturing is entered, for example, by pressing the release button again during still image capturing. When an instruction to stop continuous image capturing has not been entered (N in S22), the steps S12 to S20 are performed using the subsequently captured image as a reference image.

When an instruction to stop image capturing is entered (Y in S22), a developing process for a synthesized image is performed (S24). The developing process is performed on the synthesized image by the WB correction processing unit 32, the synchronization processing unit 33, the luminance characteristic conversion unit 34, the edge enhancement processing unit 35, the NR processing unit 36, and the color reproduction processing unit 37 in the image processing unit 20. The developed image data is written to the DRAM 19 via the bus 4 (S26), and the CPU 16 records the developed image data in the recording apparatus 21 (S28).

Figure 9:
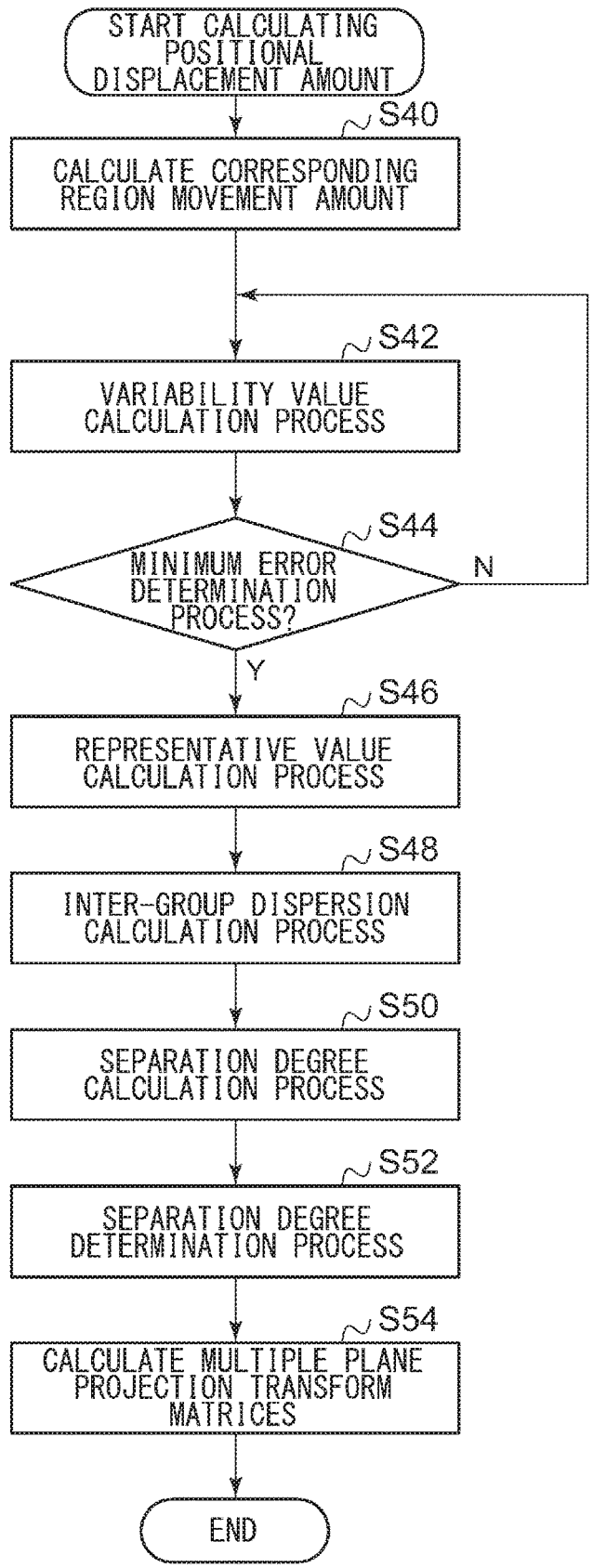
FIG. 9 is a diagram showing a flowchart of a positional displacement amount calculation process.

FIG. 9 shows a flowchart of the positional displacement amount calculation process shown in S18. In the positional displacement amount calculation unit 30, by performing an optical flow, a feature point matching, or the like on the base image and the reference image, the corresponding region movement amount calculation unit 40 derives the amounts of positional displacement of characteristic regions of the images (S40).

The variability value calculation unit 43 allocates each of the plurality of characteristic regions to one of the plurality of plane groups so as to temporarily determine a set of a plurality of plane groups, and then derives a statistical variability value of the amounts of movement of one or more characteristic regions in the temporarily determined set of a plurality of plane groups (S42). The variability value calculation unit 43 may calculate, as the statistical variability value of the temporarily determined set of a plurality of plane groups, one of a dispersion, standard deviation, and mean error of the amounts of movement of one or more characteristic regions in each plane group.

The determination unit 44 calculates, for each temporarily determined set of a plurality of plane groups, the sum of the statistical variability values of the respective plane groups. The determination unit 44 compares the sum of the calculated variability values and finds a set of a plurality of plane groups that results in a minimum sum (error) of variability values. Upon detecting the minimum sum of the variability values (Y in S44), the determination unit 44 determines the set of a plurality of plane groups as the final set and confirms the set of the plurality of plane groups.

When the set of plane groups is confirmed, the representative value calculation unit 46 derives a representative value of each plane group by calculating at least one of an average value, median value, mode value, dispersion, standard deviation, and mean error of the amounts of movement of one or more characteristic regions in each plane group (S46).

The inter-group dispersion processing unit 47 calculates the dispersion between different plane groups by using the calculated representative value (S48). The separation degree calculation unit 48 derives the degree of separation between different plane groups by using the dispersion between the groups calculated by the inter-group dispersion processing unit 47 (S50). The degree of separation is an index for determining whether or not the different plane groups are groups that exhibit different tendencies. When the value of the degree of separation between the difference plane groups is lower than the predetermined value, the separation determination unit 49 integrates the different plane groups as a single group, and when the value of the degree of separation is equal to or more than the predetermined value, the separation determination unit 49 determines that the plane groups are proper plane groups (S52). The projection transform matrix calculation unit 50 derives a projection transform matrix for each of the separated plane groups by using a known method, and calculates the amount of positional displacement of each pixel (S54).

As described above, according to the image processing technology of the embodiment, since a plurality of characteristic regions can be appropriately divided into a plurality of plane groups by performing a clustering process on a captured image in which a plurality of planes having different depths are mixed, it is possible to derive a correct projection transform matrix. Thereby, the amount of positional displacement can be accurately obtained, and a highly accurate synthesized image can be also generated.

Described above is an explanation based on the embodiments of the present invention. These embodiments are intended to be illustrative only, and it will be obvious to those skilled in the art that various modifications to constituting elements and processes could be developed and that such modifications are also within the scope of the present invention.

In the embodiment, the digital camera 1 is shown as an example of the image capturing apparatus. However, the technology described in the embodiments can be applied to other types of image capturing apparatuses as long as there is a plurality of pieces of imaging data including data of a base image and a reference image.

What is claimed is:

1. An image processing apparatus adapted to synthesize one base image with at least one reference image acquired in a time series, the image processing apparatus comprising:
a processor comprising hardware,
wherein the processor is configured to:
calculate a plurality of amounts of movement of a plurality of characteristic regions between the reference image and the base image;
temporarily determine a set of a plurality of plane groups by allocating each of the plurality of characteristic regions to one of the plane groups;
determine a final set of a plurality of plane groups based on a statistical variability value of the calculated amounts of movement of the characteristic regions in the temporarily determined set of the plurality of plane groups;
calculate a plurality of projection transform matrices by using the calculated amounts of movement of the characteristic regions and the final set of the plurality of plane groups;
calculate amounts of positional displacement of a plurality of pixels in the reference image that correspond to a plurality of pixels in the base image, by using the plurality of projection transform matrices;
transform the reference image based on the calculated amounts of positional displacement; and
produce a synthesized image by synthesizing the transformed reference image with the base image.

2. The image processing apparatus according to claim 1, wherein the processor is configured to:
calculate, as the statistical variability value of the temporarily determined set of the plurality of plane groups, one of a dispersion, a standard deviation, and a mean error of the amounts of movement of the one or more characteristic regions, in each plane group.

3. The image processing apparatus according to claim 2, wherein the processor is configured to:
calculate, for each temporarily determined set of a plurality of plane groups, a sum of the statistical variability values of the respective plane groups; and
determine, as the final set of the plurality of plane groups, a set of the plurality of plane groups that results in a minimum sum of variability values.

4. The image processing apparatus according to claim 1, wherein the processor is configured to:
calculate a degree of separation between different plane groups; and
integrate different plane groups depending on a value of the degree of separation.

5. The image processing apparatus according to claim 4, wherein the processor is configured to:
calculate, as a representative value of each plane group, at least one of an average value, a median value, a mode value, a dispersion, a standard deviation, and a mean error of the amounts of movement of one or more characteristic regions, in each plane group.

6. The image processing apparatus according to claim 5, wherein the processor is configured to:
derive the degree of separation between different plane groups by using the calculated representative value.

7. The image processing apparatus according to claim 6, wherein the processor is configured to:
integrate different plane groups as a single group when the degree of separation between the different plane groups is lower than a predetermined value.

8. The image processing apparatus according to claim 4, wherein the processor is configured to:
calculate a dispersion between different plane groups.

9. The image processing apparatus according to claim 8, wherein the processor is configured to:
derive the degree of separation between different plane groups by using the calculated dispersion between the groups.

10. The image processing apparatus according to claim 9, wherein the processor is configured to:
integrate different plane groups as a single group when the degree of separation between the different plane groups is lower than a predetermined value.

11. An image processing method adapted to synthesize one base image with at least one reference image acquired in a time series, the method comprising:
calculating a plurality of amounts of movement of a plurality of characteristic regions between the reference image and the base image;
temporarily determining a set of a plurality of plane groups by allocating each of the plurality of characteristic regions to one of the plane groups;
determining a final set of a plurality of plane groups based on a statistical variability value of the calculated amounts of movement of the characteristic regions in the temporarily determined set of the plurality of plane groups;
calculating a plurality of projection transform matrices by using the calculated amounts of movement of the characteristic regions and the final set of the plurality of plane groups;
calculating amounts of positional displacement of a plurality of pixels in the reference image that correspond to a plurality of pixels in the base image, by using the plurality of projection transform matrices;
transforming the reference image based on the calculated amounts of positional displacement; and
producing a synthesized image by synthesizing the transformed reference image with the base image.

12. A non-transitory computer readable medium encoded with a program executable by a computer adapted to synthesize one base image with at least one reference image acquired in a time series, the program causing the computer to perform functions comprising:

calculating a plurality of amounts of movement of a plurality of characteristic regions between the reference image and the base image;

temporarily determining a set of a plurality of plane groups by allocating each of the plurality of characteristic regions to one of the plane groups;

determining a final set of a plurality of plane groups based on a statistical variability value of the calculated amounts of movement of the characteristic regions in the temporarily determined set of the plurality of plane groups;

calculating a plurality of projection transform matrices by using the calculated amounts of movement of the characteristic regions and the final set of the plurality of plane groups;

calculating amounts of positional displacement of a plurality of pixels in the reference image that correspond to a plurality of pixels in the base image, by using the plurality of projection transform matrices;

transforming the reference image based on the calculated amounts of positional displacement; and producing a synthesized image by synthesizing the transformed reference image with the base image.

\* \* \* \* \*